United States Patent
Morgan et al.

(10) Patent No.: US 11,685,662 B2
(45) Date of Patent: Jun. 27, 2023

(54) COAL BASED SILICON CARBIDE FOAM

(71) Applicant: Touchstone Research Laboratory, Ltd., Triadelphia, WV (US)

(72) Inventors: Dwayne R. Morgan, Wheeling, WV (US); Frederick H. Wade, Wellsburg, WV (US)

(73) Assignee: Touchstone Research Laboratory, Ltd., Triadelphia, WV (US)

(*) Notice: Subject to any disclaimer, the term of this patent is extended or adjusted under 35 U.S.C. 154(b) by 354 days.

(21) Appl. No.: 16/946,325

(22) Filed: Jun. 17, 2020

(65) Prior Publication Data

US 2021/0395096 A1    Dec. 23, 2021

(51) Int. Cl.
*C01B 32/977*      (2017.01)

(52) U.S. Cl.
CPC .................. *C01B 32/977* (2017.08)

(58) Field of Classification Search
None
See application file for complete search history.

(56) References Cited

U.S. PATENT DOCUMENTS

| | | | | | |
|---|---|---|---|---|---|
| 4,702,900 | A | * | 10/1987 | Kurachi | C01B 32/977 423/439 |
| 5,462,800 | A | * | 10/1995 | Yamazaki | C04B 41/009 423/447.5 |
| 5,877,104 | A | * | 3/1999 | Bryson | C04B 35/571 528/33 |
| 6,087,024 | A | * | 7/2000 | Whinnery | C04B 38/062 264/44 |
| 6,656,239 | B1 | * | 12/2003 | Rogers | C04B 28/02 44/628 |
| 6,749,652 | B1 | * | 6/2004 | Rogers | B32B 5/16 264/29.7 |
| 6,814,765 | B1 | * | 11/2004 | Rogers | B32B 5/18 264/29.7 |
| 10,954,167 | B1 | * | 3/2021 | Garnier | C01B 32/956 |
| 11,186,522 | B1 | * | 11/2021 | Morgan | C04B 35/571 |
| 2003/0072704 | A1 | * | 4/2003 | Konno | C01B 32/956 423/345 |
| 2011/0135558 | A1 | * | 6/2011 | Ma | C04B 35/565 423/345 |
| 2016/0137512 | A1 | * | 5/2016 | Hase | C01B 32/956 423/345 |
| 2016/0137513 | A1 | * | 5/2016 | Hase | C01B 32/956 428/402 |
| 2019/0292441 | A1 | * | 9/2019 | Hill | C04B 38/009 |
| 2020/0115232 | A1 | * | 4/2020 | Olson, III | C01B 32/05 |
| 2020/0115285 | A1 | * | 4/2020 | Olson, III | C04B 38/0022 |
| 2021/0296652 | A1 | * | 9/2021 | Easter | C04B 35/62204 |

FOREIGN PATENT DOCUMENTS

| | | | | |
|---|---|---|---|---|
| JP | 03193617 A | * | 8/1991 | ............. C01B 31/36 |
| JP | 2006097009 A | * | 4/2006 | ............. C09C 1/56 |

* cited by examiner

*Primary Examiner* — Robert S Loewe
(74) *Attorney, Agent, or Firm* — Philip D. Lane

(57) ABSTRACT

A method for producing silicon carbide directly from comminuted coal and a silicon precursor is described. The process includes coating comminuted coal with a silicon precursor and heating the silicon precursor coated comminuted coal to initially form polymerized preceramic silicon-carbon foam and then further heating to form silicon carbide foam.

6 Claims, No Drawings

COAL BASED SILICON CARBIDE FOAM

FIELD OF THE INVENTION

The present invention is directed to forming silicon carbide using coal and a silicon source (silicone) precursor.

SUMMARY OF THE INVENTION

The present invention is directed to producing a silicon carbide foam by blending a predetermined amount of comminuted coal (carbon source) and a predetermined amount of silicone resin (silicon precursor). Within the scope of this invention is to preheat (melt) the silicone resin and add comminuted coal (carbon filler) in prescribed proportion that will yield silicon carbide when processed to temperatures adequate to fuse carbon and silicon into a crystalline periodic structure via sintering. Alternatively, in leu of heating the resin, the resin may be dissolved in organic solvent followed by adding comminuted coal (carbon filler) to prescribed proportion that will yield silicon carbide when processed to temperatures adequate to fuse carbon and silicon into a crystalline periodic structure via sintering. Heating the silicone resin above the melting point, and subsequently adding the comminuted coal powder to the melt, will effectively coat and infiltrate the comminuted coal particles. The cooled mix then consists of silicon precursor coated coal particles. The silicon precursor coated coal particles are heated under controlled temperature and pressure sufficient for the comminuted coal to form a polymerized preceramic silicon-carbon foam followed by continued heating to a temperature of at least about 1000 C for a time sufficient to pyrolyze the foam for at least a portion of the silicon precursor to react with carbon and subsequently form an amorphous (glass-like) silicon-carbon foam from coal followed by heating under controlled temperature to transition the amorphous silicon-carbon foam to crystalline silicon carbide foam. In some embodiments, the silicon precursor is a polysiloxane resin. Furthermore, organic solvents may include, but are not limited to, acetone, isopropyl alcohol, methanol, denatured alcohols, etc.

In some embodiments, the invention may include a method wherein the polysiloxane resin comprises repeating units having the formula $[-Si(R)_2-O-]_n$ wherein R may be one or more selected from the group consisting of, hydrogen methyl, ethyl, propyl, isopropyl, butyl, isobutyl, or t-butyl, and wherein n ranges from about 10 to about 100.

DETAILED DESCRIPTION OF EMBODIMENTS OF THE INVENTION

Some preferred embodiments of the present invention are described in this section in detail sufficient for one skilled in the art to practice the present invention without undue experimentation. It is to be understood, however, that the fact that a limited number of preferred embodiments are described in this section does not in any way limit the scope of the present invention as set forth in the claims.

It is to be understood that whenever a range of values is described herein, i.e. whether in this section or any other part of this patent document, that the range includes the end points and every point therebetween as if each and every such point had been expressly described. Unless otherwise stated, the words "about" and "substantially" as used herein are to be construed as meaning the normal measuring and/or fabrication limitations related to the value or condition which the word "about" or "substantially" modifies. Unless expressly stated otherwise, the term "embodiment" is used herein to mean an embodiment of the present invention.

The present invention is directed to producing a silicon carbide foam by forming silicon precursor coated coal particles and heating the coated particles to cause the direct foaming of a comminuted coal to form a polymerized preceramic foam followed by continued heating to cause pyrolysis of lower molecular weight species to form an amorphous silicon-carbon foam; followed by continued heating of the silicon-carbon foam to crystallize the amorphous foam to form silicon carbide foam.

The comminuted coal starting material includes a coal that swells to some degree upon heating. In some embodiments, the swelling coal is an agglomerating coal exhibiting a Free Swell Index as determined by ASTM D720 greater than about 0.5 and in some embodiments, between about 3.5 and about 5.0, and in additional embodiments between about 3.75 and 4.5. Suitable swelling coals may include, but are not limited to, Low Volatile, Medium Volatile, High Volatile A, High Volatile B, and High Volatile C bituminous coals exhibit the above coking or Free Swell Index properties.

The size of the coal particles in the comminuted coal is not particularly limited. In some embodiments, the size of particles in the comminuted coal source may range from about 0.020 mm (or less) to about 0.5 mm. In certain embodiments, the coal is comminuted to a size such that essentially all of the coal will pass through an 80 mesh screen (U.S. Standard Sieve Series). Such 80 mesh screens have openings of about 0.18 mm. In other embodiments, the coal is comminuted to a size such that essentially all of the coal will pass through a 140 mesh screen (U.S. Standard Sieve Series). Such 140 mesh screens have openings of about 0.105 mm. In still other embodiments, suitable coals comminuted to other mesh sizes may be utilized. In various embodiments, the coal may be comminuted to sizes below about 0.42 mm, in other embodiments below about 0.18 mm, and in yet other embodiments below about 0.105 mm. In some embodiments, coals comminuted to larger particle size distributions will provide carbon foams having larger cell sizes. In other embodiments, coals comminuted to smaller particle size distributions will provide carbon foams having smaller cell sizes.

In the present process, the preceramic foam is formed in situ via heating comminuted coal in the presence of the silicon precursor. The following information relates to the properties of carbon foam structure, excluding any silicon. As this method creates the silicon carbide foam in the presence of the silicon precursor and coal, the physical characteristic of the combined material will vary from that of carbon foam alone. Carbon foam is typically a strong, open cell, durable, stable, easily machined, and relatively unreactive lightweight material. Carbon foams are carbonaceous materials of very high carbon content that have appreciable void volume. As such, carbon foams are primarily comprised of (elemental) carbon. In appearance, excepting color, carbon foams resemble readily available commercial plastic foams. The void volume of carbon foams is located within numerous empty cells. The boundaries of these cells are defined by the carbon structure. These cells typically approximate ovoids of regular, but not necessarily uniform, size, shape, distribution, and orientation. The void volumes in these cells may directly connect to neighboring void volumes. Such an arrangement is referred to as an open-cell foam. The carbon in these foams forms a structure that is continuous in three dimensions across the material. Typically, the cells in carbon foams are of a size that is readily visible to the unaided human eye. Also, the void volume of carbon foams is such that it typically occupies much greater than one-half of the carbon foam volume. The density of carbon foams typically is less than about 1 g/cc and generally less than about 0.8 g/cc. In some embodiments, the density for carbon foam may range from about 0.05 g/cc to about 0.8 g/cc. In some embodiments, carbon foams may exhibit compressive strengths ranging up to about 10,000 psi. In other embodiments, the compressive strength for carbon foam may range from about 100 psi to about 10,000 psi. In certain other embodiments, compressive strengths for carbon foam may range from about 400 psi to about 7,000 psi. The carbon foam may be carbonized carbon foam. Alternatively, if desired, the carbon foam may be graphitized carbon foam.

The above comminuted coal is blended with a silicon precursor. The silicon precursor may be any silicon containing compounds that can provide silicon that reacts with carbon from the coal at elevated temperatures such as 1000 C that is a solid or particulate at room temperature. A preferred silicon precursor includes, a polysiloxane silicon-based compound. As used herein "polysiloxane" is a chemical compound having branched or unbranched backbones consisting of repeating siloxane units $[-Si(R)_2-O-]_n$ with side chains R attached to the silicon atoms, where R may be hydrogen or a C1 to about C4 hydrocarbon group, including but not limited to a methyl, ethyl, propyl, isopropyl, butyl, isobutyl, or t-butyl group. Preferably, the polysiloxane ranges from about 10 to about 100 repeating siloxane units. In preferred embodiments, at least 50% of the repeating siloxane units are dimethyl siloxane units. In other embodiments dimethyl siloxane may range from about 20% to 100% of the siloxane repeating units.

The silicon precursor may be a solid at room temperature and in the form of particles. The size of the silicon precursor is not particularly limited. In certain embodiments the size of the particulate silicon precursor may be similarly sized with the particle sizes of the comminuted coal. In some embodiments, the size of the particulate silicon precursor may range from about 0.010 mm to about 0.5 mm. The size of the particulate silicon precursor may be larger than the size of the comminuted coal particles, or in alternative embodiments, the size of the particulate silicon precursor may be smaller than the size of the comminuted coal particles.

The relative amount or ratio of comminuted coal to particulate silicon is not particularly limited and may vary depending on the desired properties for the silicon carbide foam. In some embodiments, the available carbon in the comminuted coal and silicon from the particulate silicon are provided in stoichiometric amounts or in a 1:1 molar ratio. If desired, that amount of particulate silicon may be provided in less than a 1:1 molar ratio. In still further embodiments, the particulate silicon may be provided in excess of the available carbon. In some embodiments, the particulate silicon may be provided in an amount ranging from about 0.1 to about 10 times the amount of silicon to available carbon in the comminuted coal. When the particulate silicon is provided in stoichiometric excess, the excess silicon remains with the final silicon carbide foam product forming a composite silicon carbide—silicon and silicon carbide—silicon dioxide composites.

In some embodiments, the desired or predetermined amounts of comminuted coal and particulate silicon are blended together to form a bended mixture. First, the particulate silicon precursor is heated above the melting point to allow the comminuted coal particles to become coated, and in some embodiments, infiltrated with the melted silicon precursor. In some embodiments, stirring or other agitation methods may be used to provide even or consistent coating of the comminuted coal particles. The cooled mixture contains comminuted coal particles coated with the silicon precursor. The coating may be complete or partial. If necessary, cool mixture is broken apart or otherwise formed into particles and added to a mold for further processing. The size and shape of the mold or pan is not particularly limited. In other embodiments, the mixing step may be performed directly in the mold. In some embodiment the mold may have a near net shape, close to the desired final shape of the product. In another embodiment, the silicon precursor is heated above its melting point followed by addition of the comminuted coal particles to the melted silicon precursor. In some embodiments, stirring or other agitation methods maybe used to provide even or consistent coating and mixing of the comminuted coal particles. The mixture may be added to a mold for further processing. The size and shape of the mold or pan is not particularly limited. In some embodiments the mold may have a near net shape, close to the desired final shape of the product. In still other embodiments, the silicon precursor may be dissolved using a solvent in leu of heating the silicon precursor to a melt. The type of solvent is not particularly limited but should dissolve a majority of the silicon precursor and not be detrimental to or significantly inhibit the forming a foam. Suitable solvents may include, but are not limited to, organic solvents including, but are not limited to, acetone, isopropyl alcohols, methanol and other denatured alcohols. Once the silicon precursor is substantially or completely dissolved in the solvent, comminuted coal particles may added to the solution in mixed thoroughly. In some embodiments, stirring or other agitation methods maybe used to provide even or consistent coating and mixing of the comminuted coal particles. The mixture may be added to a mold for further processing or alternatively the solvent may be removed to provide silicon precursor coated coal particles which may be transferred to a mold for further processing or stored for later use. The size and shape of the mold or pan is not particularly limited. In some embodiments the mold may have a near net shape, close to the desired final shape of the product.

The method includes a polymerization preceramic foam forming step followed by a glass forming step (pyrolysis) followed by a silicon carbide forming step (sintering). Advantageously, no additional materials are needed once the preceramic polymerization foam forming step is started and the entire process to form silicon carbide occurs in a simple and direct method.

The foam forming step causes the silicon coated comminuted coal to foam and form a polymerized preceramic foam. The foam forming step is similar to that for forming carbon foams from coal under controlled heating and pressure, preferable under an inert atmosphere known to those skilled in the art. Some of these methods include producing carbon foams directly from particulate coal. For example, U.S. Pat. Nos. 6,749,652 and 6,814,765, each herein incorporated by reference in their entirety, describe methods for producing carbon foam directly from particulate coal and are suitable for use in conjunction with the present invention. A suitable swelling coal, such as bituminous coal, is heated at a controlled, predetermined rate, in an essentially closed vessel. The silicon coated comminuted coal is placed in a mold and is heated in an inert atmosphere under process atmospheric positive pressure that may range from greater that 14.7 psi, i.e. near ambient atmospheric pressure, to greater than ambient atmospheric pressure and can reach pressures of about 500 psi or greater. The silicon coated comminuted coal is heated to temperatures sufficient to cause the coal to become plastic and swell, forming a polymerized preceramic foam. In many instances heating the particulate coal to a temperature between about 300° C. and about 500° C. is sufficient to form a polymerized preceramic foam material from the silicon coated comminuted coal. The temperatures and pressure conditions will vary depending upon the characteristics of the particulate coal, the blended mixture, and desired swell to form foam structure. In some embodiments, the final elevated temperature for the foam forming step may need to be held for a period of time to allow the foam to form. This hold time may vary depending on the coal and the blended mixture but may typically range from about 15 minutes to 5 hours or more.

Once the foam forming step has been completed, the now formed polymerized preceramic foam undergoes a pyrolysis step to drive off higher temperature low molecular weight volatile species from coal followed by a higher temperature sintering step, of the pyrolyzed amorphous (glass-like) foam structure, to form crystalline silicon carbide. The silicon carbide forming step includes heating the amorphous silicon-carbon foam to a temperature sufficient for the silicon precursor, and in a preferred embodiment, polysiloxane resin precursor, to react with carbon in the foam to form silicon carbide. This heating step is preferably performed in an inert atmosphere such as helium or argon. In some embodiments, the foam is heated to a temperature from about 1000 C to about 2000 C depending on the desired properties and crystalline polymorphs of the SiC. In some embodiments the heating step takes place at about 5 C/min to reach the final temperature followed by holding at the desired temperature for about 1 to about 4 hours or longer followed by slowly cooling the silicon carbide foam to room temperature.

By heating the amorphous silicon-carbon foam to a temperature of about 1000 C to about 2000 C, a certain amount of the particulate silicon precursor, polysiloxane resin will react with the carbon in the carbon foam to form silicon carbide. In some embodiments, the resultant silicon carbide foam will have a yield of silicon carbide of from about 50% to about 99% silicon carbide based on the amount of silicon from the polysiloxane resin (limiting reactant). Other considerations in the final SiC yield. In other embodiments, the silicon carbide yield may range from about 80% to about 99% and still further from about 85% to about 95%.

While several embodiments of the present invention have been shown and described, it will be obvious to those skilled in the art that many changes and modifications may be made thereunto without departing from the spirit and scope of the invention as described in the claims. All United States patents and patent applications, all foreign patents and patent applications, and all other documents identified herein are incorporated herein by reference as if set forth in full herein to the full extent permitted under the law.

What is claimed is:

1. A method for producing a silicon carbide comprising the steps of:
    providing a liquid silicon precursor;
    adding comminuted coal to the liquid silicon precursor to form silicon precursor coated comminuted coal;
    heating the silicon precursor coated comminuted coal under controlled pressure to a temperature sufficient to form a polymerized preceramic foam; and
    continued heating to a temperature sufficient for at least a portion of the polymerized preceramic foam to react with carbon in the foam to form silicon carbide.

2. The method of claim 1, wherein the liquid silicon precursor comprises a polysiloxane resin comprising repeating units having the formula $[-Si(R)_2-O-]_n$, wherein R is one or more selected from the group consisting of hydrogen methyl, ethyl, propyl, isopropyl, butyl, isobutyl, and t-butyl, and wherein n ranges from about 10 to about 100.

3. The method of claim 2, wherein R on the repeating unit is methyl for at least 50% of the repeating units of the polysiloxane resin.

4. The method of claim 2, wherein the silicon carbide foam exhibits a yield of silicon carbide from about 50% to about 99% silicon carbide based on the amount of silicon from the polysiloxane resin.

5. The method of claim 1, wherein the liquid silicon precursor is formed by melting a solid silicon resin.

6. The method of claim 1, wherein the liquid silicon precursor is formed by dissolving a particulate silicon resin in a solvent.

* * * * *